United States Patent
Cooper

(10) Patent No.: US 6,644,722 B2
(45) Date of Patent: Nov. 11, 2003

(54) MOLDED ARTICLE HAVING A RIGID SUPPORT AND A RIGID HOLLOW MEMBER

(75) Inventor: Christopher Cooper, Moon Township, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 10/053,112

(22) Filed: Jan. 17, 2002

(65) Prior Publication Data

US 2003/0132647 A1 Jul. 17, 2003

(51) Int. Cl.⁷ .............................................. B62D 25/14
(52) U.S. Cl. ................. 296/188; 296/190.09; 296/205; 296/208; 296/70; 29/897.2; 52/731.6
(58) Field of Search ................. 296/187, 186, 296/190.09, 193, 203.01, 205, 208, 29, 30, 194, 203.02, 146.6, 70, 120, 121, 122, 155; 29/897.2, 897.312, 897.35; 52/731.6, 731.1, 731.2, 735.1, 738.1; 280/779; 454/69; 264/512, 515, 516, 523, 535, 571

(56) References Cited

U.S. PATENT DOCUMENTS

| | | | |
|---|---|---|---|
| 3,367,809 A | * 2/1968 | Soloff | 264/445 |
| 5,100,204 A | 3/1992 | Makihara et al. | 297/452 |
| 5,122,325 A | 6/1992 | Bartley et al. | 264/531 |
| 5,190,803 A | 3/1993 | Goldbach et al. | 428/138 |
| 5,354,114 A | 10/1994 | Kelman et al. | 296/192 |
| 5,364,159 A | 11/1994 | Kelman et al. | 296/192 |
| 5,658,041 A | * 8/1997 | Girardot et al. | 296/194 |
| 5,762,395 A | 6/1998 | Merrifield et al. | 296/203 |
| 5,934,733 A | 8/1999 | Manwaring | 296/72 |
| 5,934,744 A | 8/1999 | Jergens et al. | 296/192 |
| 5,976,451 A | 11/1999 | Skaja et al. | 264/516 |
| 6,139,082 A | 10/2000 | Davis, Jr. et al. | 296/72 |
| 6,186,885 B1 | 2/2001 | Ahn et al. | 454/121 |
| 6,196,828 B1 | 3/2001 | Newby, Sr. | 425/522 |
| 6,216,810 B1 | * 4/2001 | Nakai et al. | 296/194 |
| 6,273,495 B1 | 8/2001 | Haba et al. | 296/194 |
| 6,273,496 B1 | * 8/2001 | Guyomard et al. | 296/194 |
| 6,398,259 B1 | * 6/2002 | Palmer et al. | 280/779 |
| 6,421,979 B1 | * 7/2002 | Fischer et al. | 52/716.7 |
| 6,503,585 B1 | * 1/2003 | Wagenblast et al. | 428/34.1 |

OTHER PUBLICATIONS

Patent Abstracts of Japan vol. 1996, No. 11, Nov. 29, 1996 & JP 08 192457 A (Toyoda Spinning & Amp; Weaving Co Ltd), Jul. 30, 1996 abstract.
Patent Abstracts Of Japan vol. 016, No. 406 (C–0978), Aug. 27, 1992 & JP 04 135510 A (Touyou Shiito:KK;Others:02), May 11, 1992 abstract.
Patent Abstracts Of Japan vol. 2002, No. 05, May 3, 2002 & JP 2002 010453 A (INOAC Corp;Furukawa Electric Co Ltd:The), Jan. 11, 2002 abstract.
Patent Abstracts of Japan vol. 1995, No. 01, Feb. 28, 1995 & JP 06 285963 A (Tsuchiya Mfg Co Ltd.), Oct. 11, 1994 abstract.

* cited by examiner

Primary Examiner—Dennis H. Pedder
Assistant Examiner—Jason Morrow
(74) Attorney, Agent, or Firm—Joseph C. Gil; James R. Franks

(57) ABSTRACT

A molded article, e.g., a cross car beam (3), which includes a rigid support (a) having a plurality of perforations, e.g., rigid support (12), and a rigid hollow thermoplastic member (b), e.g., an air duct (15), attached thereto is described. A portion of the thermoplastic material of rigid hollow member (b) extends through at least some of the perforations of rigid support (a), embedding the edges of the perforations therein. The thermoplastic material extending through the perforations forms an attachment element, e.g., an attachment head (24), that serves to fixedly attach rigid hollow member (b) to rigid support (a). Also described is a method of preparing the molded article of the present invention, in which the rigid hollow member (b) is fixedly attached to the rigid support (a) during the blow mold fabrication of rigid hollow member (b).

19 Claims, 5 Drawing Sheets

MOLDED ARTICLE HAVING A RIGID SUPPORT AND A RIGID HOLLOW MEMBER

DESCRIPTION OF THE INVENTION

The present invention relates to a molded article which includes a hollow blow molded thermoplastic rigid member that is integrally attached to a rigid support, e.g., a metal plate. A thermoplastic parison precursor of the hollow rigid thermoplastic member is blow molded against the rigid support. Portions of the thermoplastic parison extend through perforations in the rigid support, thereby attaching the hollow thermoplastic rigid member to the rigid support. The present invention also relates to a process by which the molded article is prepared.

In applications involving the transportation of air, a plastic conduit is typically used, as is the case, for example, in some heating, ventilating and air conditioning (HVAC) systems. The plastic conduit may be self supporting. However, in those applications where additional structural and dimensional stability are required (e.g., in the automotive and aircraft industries), the plastic conduit is often connected to and supported by a separate support structure. In most automotive vehicles, a cross car beam spans and extends between the vehicle door pillars (commonly referred to as the A-pillars). The cross car beam, which is typically fabricated from metal, provides rigidity and structural support to the vehicle, e.g., relative to a lateral impact upon the vehicle. The cross car beam also typically provides support for and is attached to the interior instrument panel and the HVAC system of the vehicle.

Typically the plastic conduit and the support structure are separately fabricated, and then attached together in a separate step. The plastic conduit and support structure (e.g., a cross car beam in the form of a metal beam or tube) are typically attached together by means of, for example, fasteners, adhesives, straps and/or brackets. Such attachment methods typically involve a series of manufacturing steps, and the use of additional materials. e.g., rivets, bolts and adhesives. In the case of an automotive application, for example, the separately fabricated cross car beam and plastic conduit, when assembled together, can take up an undesirably large amount of space within the passenger compartment.

In the transportation industries, e.g., the automotive and aircraft industries, it is desirable to minimize the weight of the vehicle or aircraft in an effort towards maximizing fuel efficiency. The total weight of a vehicle or aircraft can be reduced by reducing the weight of its components. However, it is generally required that the strength and rigidity of a component not be compromised as the weight of the component is reduced. It is also desirable in the transportation industries to minimize the space occupied by various components that are incorporated into the vehicle or aircraft.

A need thus exists for the development of molded articles having a rigid support and a rigid thermoplastic hollow member attached thereto, that provide a combination of structural stability, reduced weight and compact (or space saving) design. A need also exists with regard to the development of new methods of preparing such molded articles in which the rigid thermoplastic hollow member is concurrently molded and fixedly attached to the support structure during formation of the rigid thermoplastic hollow member.

U.S. Pat. No. 5,354,114 discloses an integrated cross car structural duct cluster. The integrated cross car structural duct cluster of the '114 patent is disclosed as including a steel plate that is attached to a molded plastic body of a thermoplastic or thermoset material.

In accordance with the present invention, there is provided a molded article comprising:

(a) a rigid support having a first surface, a second surface and a plurality of perforations having edges; and (b) a molded rigid member of thermoplastic material, at least a portion of said rigid member being in abutting relationship with the first surface of said rigid support, said rigid member having a hollow interior, wherein said article is prepared by a process comprising blow molding a thermoplastic parison precursor of said rigid member (b) onto the first surface of said rigid support (a), a portion of the thermoplastic material of said thermoplastic parison extends through at least some of said perforations of said rigid support (a), the edges of said perforations being embedded in the plastic material extending therethrough, thereby fixedly attaching said rigid member (b) to said rigid support (a).

In further accordance with the present invention, there is also provided a method of preparing a molded article comprising a molded rigid hollow thermoplastic member fixedly attached to a rigid support, said method comprising:

(I) placing said rigid support in a mold, said rigid support having a plurality of perforations having edges, a first surface and a second surface; and (II) blow molding a thermoplastic parison precursor of said rigid hollow member against the first surface of said rigid support;

wherein a portion of the thermoplastic material of said thermoplastic parison extends through at least some of said perforations of said rigid support, the edges of said perforations being embedded in the plastic material extending therethrough, thereby attaching fixedly said rigid hollow member to said rigid support.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions, such as those expressing structural dimensions, quantities of ingredients, etc. used in the specification and claims are understood as modified in all instances by the term "about."

BRIEF DESCRIPTION OF THE DRAWINGS

In FIGS. 1 through 8, like reference numerals designate the same components and structural features.

DETAILED DESCRIPTION OF THE INVENTION

Figure 1:
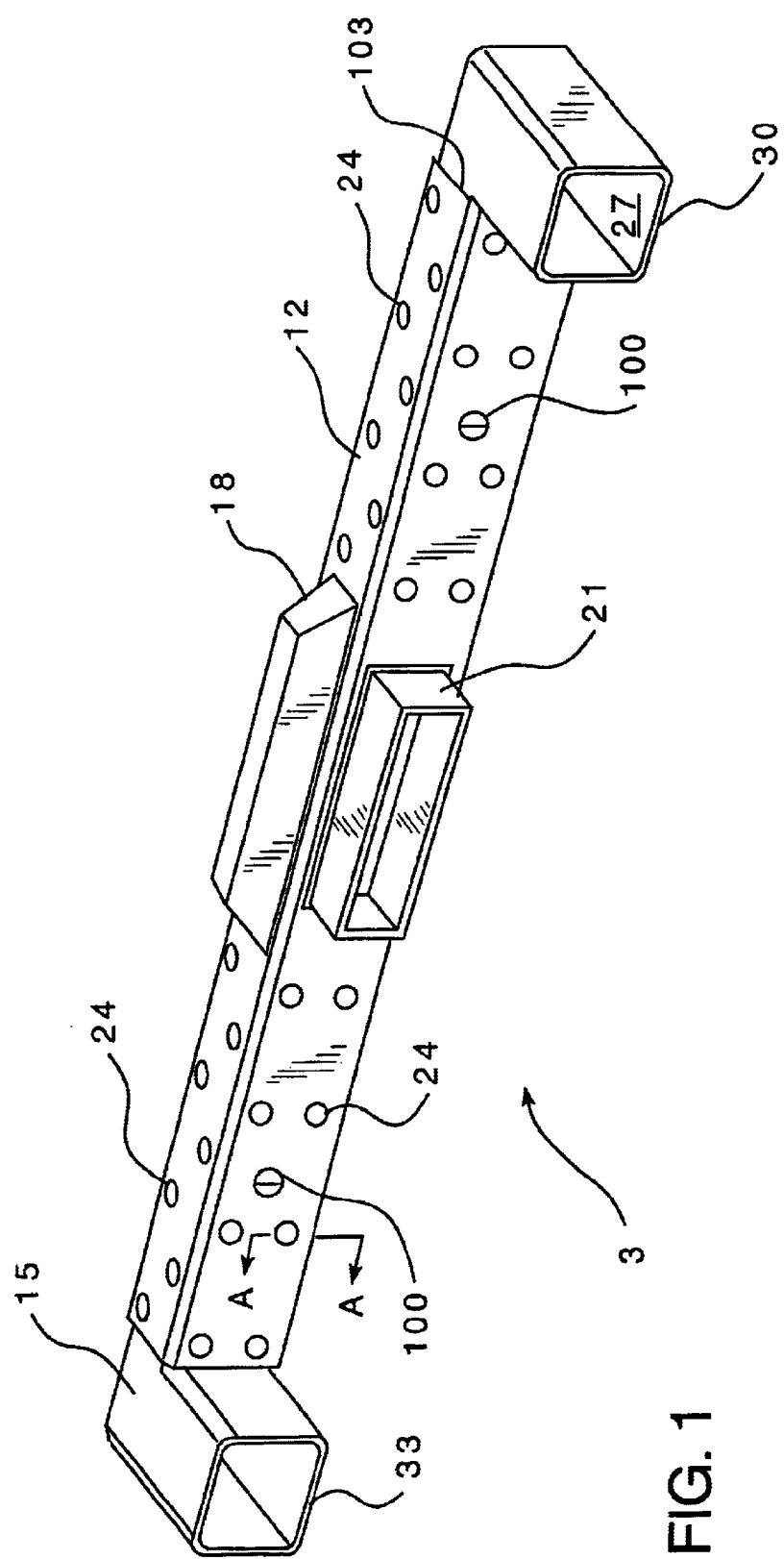
FIG. 1 is a representative perspective view of a molded cross car beam according to the present invention, which includes a blow molded rigid hollow thermoplastic duct 15 that is fixedly attached to a rigid support 12.
Figure 2:
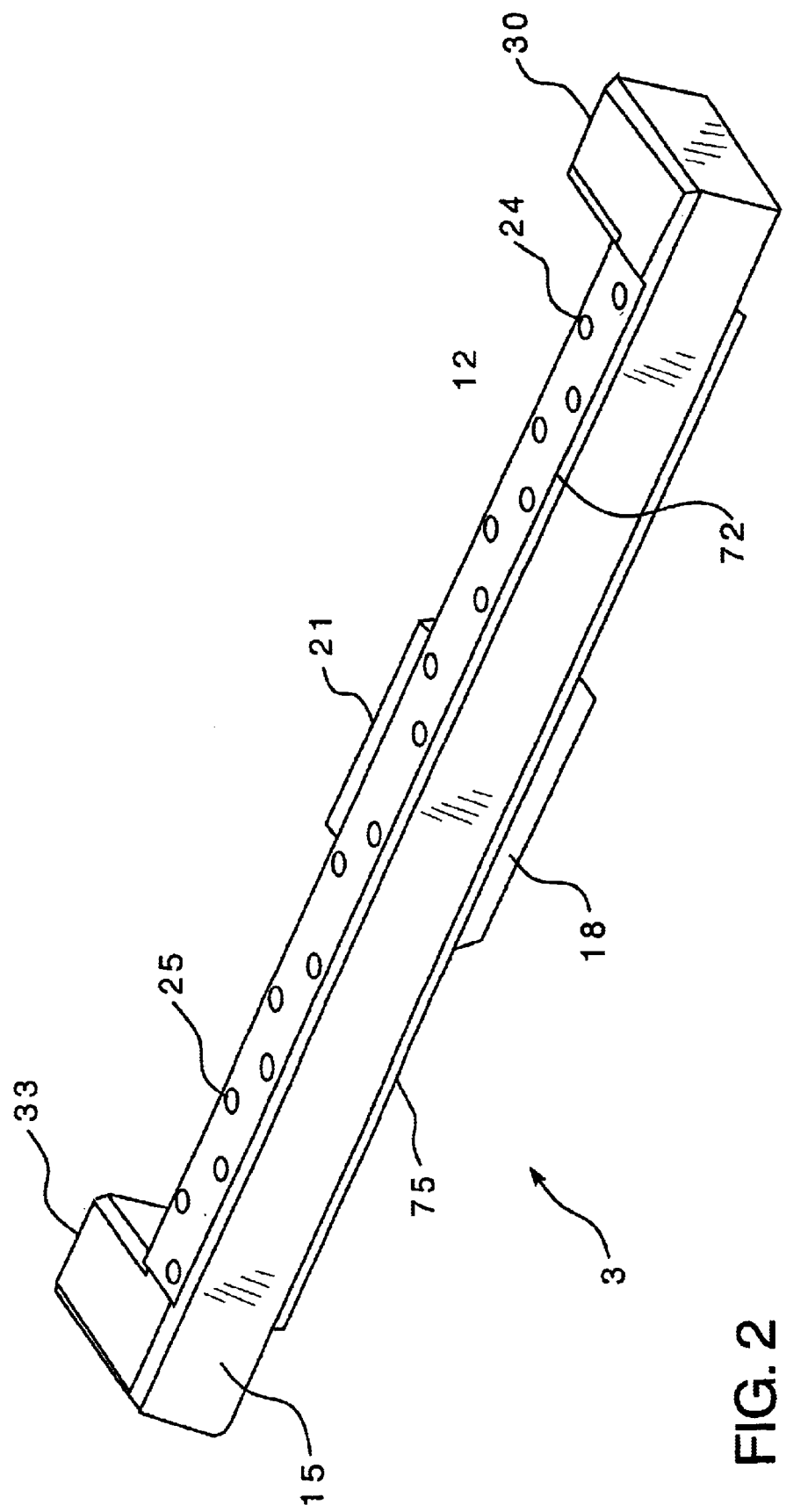
FIG. 2 is a representative perspective view of the molded cross car beam of FIG. 1, rotated 180° about its long axis.

Referring now to FIGS. 1 and 2 of the drawings, there are depicted representative perspective views of a molded composite cross car beam 3 according to the present invention. Cross car beam 3 includes a U-shaped rigid support 12 having a plurality of perforations (not shown), and a blow molded rigid, continuous and unitary air duct 15 of thermoplastic material, having a hollow interior 27. Rigid hollow duct 15 is attached to rigid support 12 by means of a plurality of attachment heads 24. Duct 15 has extensions 18, 21, 30 and 33 which each provide gaseous communication with the interior 27 of duct 15. For example, conditioned air (e.g., heated, cooled or dehumidified air) introduced through extension 21 travels through interior 27 and can exit duct 15 through extensions 18, 30 and 33. Cross car beam 3 can be used as a cross car beam extending between the door pillars of a vehicle, such as a car or truck, not shown.

The rigid support (a), e.g., rigid support 12 of cross beam 3, of the molded article of the present invention may be fabricated from a material selected from metal, thermoset plastic material, thermoplastic material and combinations thereof. Metals from which rigid support (a) may be fabricated include, but are not limited to, aluminum and steel. In a preferred embodiment of the present invention, rigid support 12 of cross car beam 3 is fabricated from metal, e.g., steel.

As used herein and in the claims the term "thermoset plastic material" means plastic materials having a three dimensional crosslinked network resulting from the formation of covalent bonds between chemically reactive groups, e.g., active hydrogen groups and free isocyanate groups. Thermoset plastic materials from which rigid support (a) may be fabricated include those known to the skilled artisan, e.g., crosslinked polyurethanes, crosslinked polyepoxides and crosslinked polyesters. Of the thermoset plastic materials, crosslinked polyurethanes are preferred. Rigid support 12 may be fabricated from crosslinked polyurethanes by the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components. Upon complete reaction of the injected components, the mold is opened and the molded article, e.g., rigid support 12, is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups.

Examples of thermoplastic materials from which rigid support (a), e.g., rigid support 12 of cross car beam 3, may be fabricated include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyethylene, thermoplastic polypropylene, thermoplastic acrylonitrile-butadiene-styrene, thermoplastic polyvinylchlorine and mixtures or thermoplastic compositions containing one or more thereof. Of the thermoplastic materials from which rigid support (a) may be fabricated, thermoplastic polyamides are preferred. Rigid support 12 may be fabricated from thermoplastic materials by the art-recognized process of injection molding, in which a molten stream of thermoplastic material, e.g., molten thermoplastic polyamide, is injected into a mold, e.g., an optionally heated mold. Upon cooling the filled mold, the molded article, e.g., rigid support 12, is removed. A preferred thermoplastic material from which rigid support 12 may be fabricated is thermoplastic polyamide, e.g., DURETHAN thermoplastic polyamide, commercially available from Bayer Corporation.

The thermoset plastic materials and/or thermoplastic materials from which rigid support (a) may be fabricated, may optionally be reinforced with a material selected from glass fibers, carbon fibers, boron fibers, metal fibers, polyamide fibers (e.g., KEVLAR polyamide fibers) and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials of rigid support (a), e.g., rigid support 12, in a reinforcing amount, e.g., in an amount of from 5 percent by weight to 60 percent by weight, based on the total weight of rigid support (a).

The thermoplastic material of blow molded rigid hollow member (b), e.g., duct 15, may be selected independently from those examples recited previously herein with regard to rigid support (a). In an embodiment of the present invention, the thermoplastic material of blow molded rigid hollow member (b) is selected from at least one of thermoplastic polyolefins (e.g., thermoplastic polyvinylchloride), thermoplastic polyvinylchlorine, thermoplastic polyurethanes, thermoplastic polyureas, thermoplastic polyamides, thermoplastic polyesters and thermoplastic polycarbonates. Thermoplastic polyolefins from which the blow molded rigid hollow member (b) may be fabricated include, for example, thermoplastic polyethylene, thermoplastic polypropylene, thermoplastic copolymers of ethylene and propylene, and thermoplastic polybutylene. In a preferred embodiment of the present invention, blow molded rigid hollow member (b) is fabricated from thermoplastic polyamide (e.g., DURETHAN thermoplastic polyamide, commercially available from Bayer Corporation).

The thermoplastic materials from which blow molded rigid hollow member (b) may be fabricated, may optionally be reinforced with a material selected from glass fibers, carbon fibers, boron fibers, metal fibers, polyamide fibers and mixtures thereof. The reinforcing materials, e.g., glass fibers, may be treated, e.g., sized, as described previously herein with regard to rigid support (a). If used, the reinforcement material, e.g., glass fibers, is typically present in the thermoplastic materials of blow molded rigid hollow member (b), e.g., duct 15, in a reinforcing amount, e.g., in an amount of from 5 percent by weight to 60 percent by weight, based on the total weight of blow molded rigid hollow member (b).

The plastic materials of rigid support (a) and blow molded rigid hollow member (b) may each independently further contain one or more functional additives. Additives that may be present in the plastic material of the rigid support (a) and/or the blow molded rigid hollow member (b) of the molded article include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material of the rigid support and/or the blow molded rigid hollow member in functionally sufficient amounts, e.g., in amounts independently from 0.1 percent by weight to 10 percent by weight, based on the total weight of the plastic material of the rigid support or the blow molded rigid hollow member.

As used herein and in the claims, the term "rigid" of rigid support (a) and blow molded rigid hollow member (b) generally means that the materials from which these elements are fabricated are self supporting. More specifically, rigid support (a) and blow molded rigid hollow member (b) each typically and independently have a flexural modulus of at least 500 MPa, e.g., from 1000 MPa to 15,000 MPa.

Rigid hollow member (b), e.g., duct 15 of cross car beam 3, is fixedly attached to rigid support (a), e.g., rigid support 12, during the blow molding fabrication of rigid hollow member (b). Rigid support 12, having a plurality of perforations (not shown in FIGS. 1 and 2), is placed on one side of the blow mold, its second surface facing the interior surface of the mold wall, and its first surface facing the open interior of the mold. A rigid thermoplastic feed material, e.g., in the form of pellets, is extruded, typically in an extruder, and the resulting molten extrudate is passed through a die to form a hollow molten tube, which is referred to as a parison. The parison, which is a precursor of duct 15, is drawn through or into the open mold into which rigid support 12 has been previously placed. The mold is closed around the parison, pinching off at least one end of the parison. Compressed gas is then fed into the interior of the parison, which expands to fill the interior of the closed mold, abutting at least a portion of the first surface of rigid support 12 therein. A portion of the thermoplastic material of the parison extends through at least some of the perforations of support 12 to form attachment heads 24. While maintaining the internal pressure within the parison, the expanded parison is allowed to cool and solidify within the mold. The increased gaseous pressure within the molded article is released, and the mold is opened, and cross car beam 3 is removed.

Figure 3:
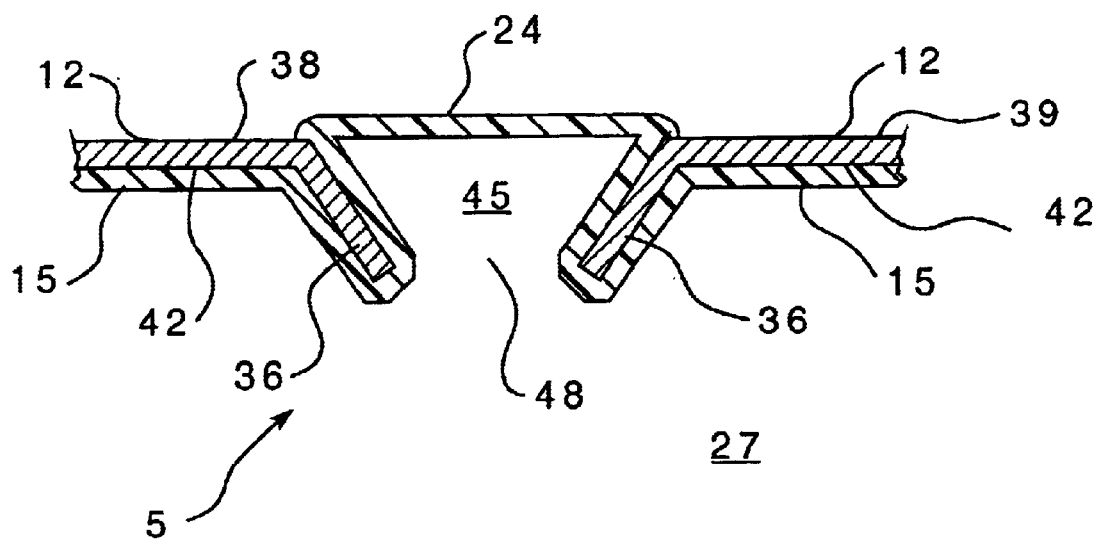
FIG. 3 is a representation of a section of an attachment means through line A—A of FIG. 1.

A sectional representation through line A—A of an attachment head 24 of FIG. 1, is depicted as attachment means 5 in FIG. 3. Rigid support 12 has a perforation 48 therein. Perforation 48 is defined by deformed edge portions 36. A portion of the thermoplastic material of duct 15 abuts against first surface 42 of support 12, and extends through perforation 48 and extends out over a portion of second surface 39 of support 12 to form attachment head 24. The deformed edges 36 of perforation 48 are embedded in the thermoplastic material of duct 15 extending therethrough. Attachment head 24 is typically shaped by means of corresponding indentations in the interior wall of the mold that are aligned with perforations 48.

In FIG. 3, the hollow interior 27 of duct 15 is in communication with the hollow interior 45 of attachment head 24. By selecting perforation 48 of smaller diameter and/or thermoplastic material of duct 15 of greater thickness, the thermoplastic material extending through perforation 48 may fuse together, effectively plugging perforation 48 and forming a substantially solid attachment head 24 (not shown). Alternatively, the hollow interior 45 of attachment head 24 may not be in communication with interior 27 of duct 15, due to plugging of perforation 48 by the thermoplastic material extending therethrough.

To assist the extension of portions of the parison through perforations 48 during the blow molding process, at least one of: (i) increased gaseous pressure is provided on the interior of the thermoplastic parison; and (ii) reduced gaseous pressure is provided on the second surface 39 of rigid support 12, thereby forcing (e.g., drawing and/or pushing) portions of the thermoplastic parison through at least some of perforations 48. In an embodiment of the present invention, the parison is extended through perforations 48 by the concurrent implementation of methods (i) and (ii).

In addition to attachment heads 24, duct 15 may be further fixedly attached to rigid support 12 by attachment means selected from fasteners 100, adhesives 103 and combinations thereof. Examples of fasteners that may be used in the present invention include, but are not limited to, screws, e.g., sheet metal screws, nuts and bolts, and metal rivets. Adhesives that may be used include those that are known to the skilled artisan, e.g., epoxy resin based adhesives.

As used herein and in the claims, the term "adhesives" refers to: (i) adhesive materials that are separate from the rigid support and the rigid hollow member, e.g., epoxy resin based adhesives; and (ii) cohesive adhesion between the rigid support and the rigid hollow member. The materials from which each of rigid support 12 and duct 15 are fabricated may be selected such that cohesive adhesion therebetween results from their mutual abutment. In an embodiment of the present invention, rigid support 12 is fabricated from steel, and the duct 15 is fabricated from DURETHAN thermoplastic polyamide (commercially available from Bayer Corporation), and cohesive adhesion results from their mutual abutment.

Figure 4:
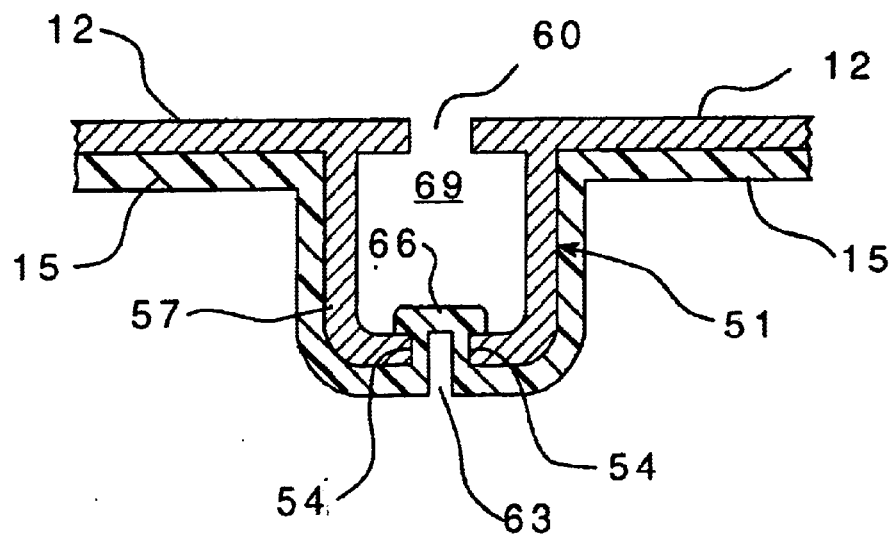
FIG. 4 is a sectional representation of an anchoring extension extending into the molded rigid hollow thermoplastic member of a molded cross car beam according to the present invention.
Figure 5:
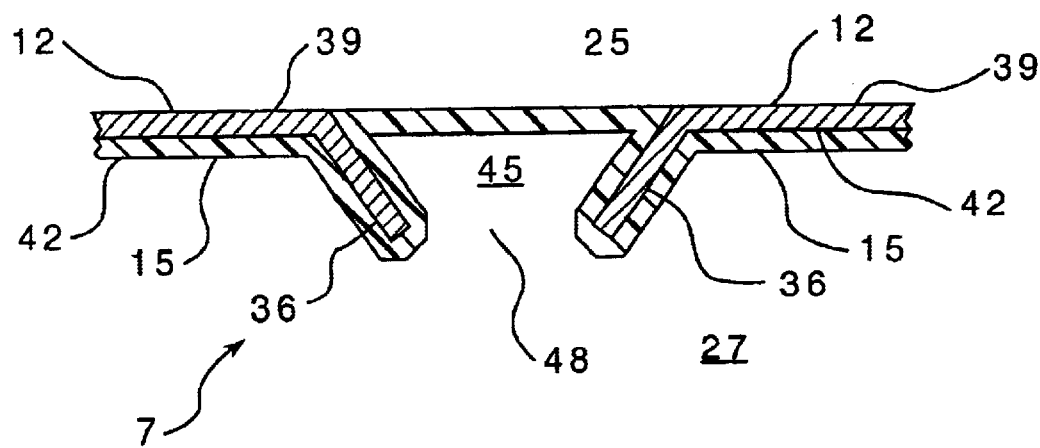
FIG. 5 is a sectional representation of an attachment means similar to that of FIG. 3.

Additional attachment means in accordance with the present invention are depicted in FIGS. 4, 5, 6 and 7. Attachment means 7 of FIG. 5 is similar to attachment means 5 of FIG. 3. Attachment head 25 of attachment means 5, however, is substantially flush with second surface 39 of support 12. The flush attachment head 25 is formed by means of the interior surface of the mold being substantially flush or in abutment with second surface 39 of support 12.

Figure 6:
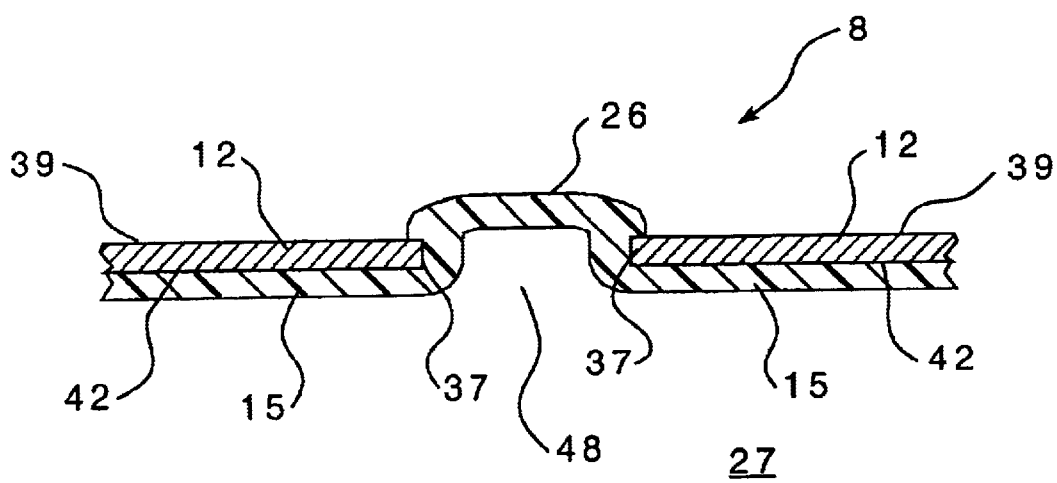
FIG. 6 is a sectional representation of an attachment means similar to that of FIG. 3.

Attachment means 8 of FIG. 6 is similar to attachment means 5 of FIG. 3, however perforation 48 is defined by non-deformed edge portions 37. Non-deformed edge portions 37 of perforation 48 are embedded in the thermoplastic material of duct 15 extending there through, which forms attachment head 26. During the blow molding operation attachment head 26 is shaped by means of abutment with the interior surface of the mold.

Figure 7:
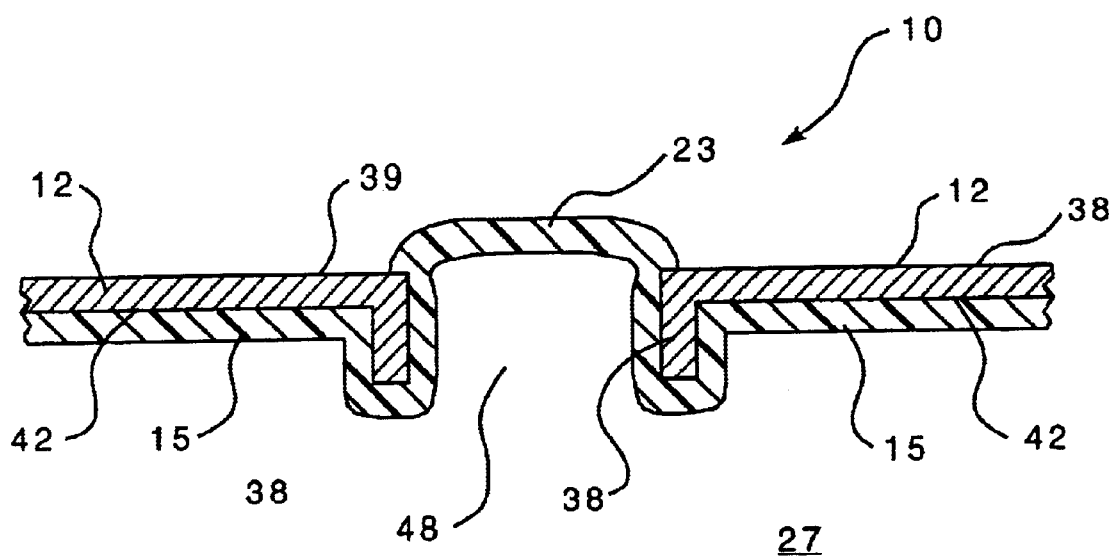
FIG. 7 is a sectional representation of an attachment means similar to that of FIG. 3.

Perforation 48 of attachment means 10 of FIG. 7 is defined by deformed edge portions 38, which have a configuration different than that of deformed edge portions 36 of FIGS. 3 and 5. Relative to second surface 39, the deformed edge portions 36 of FIGS. 3 and 5 tilt in at an angle of less than 90°, while edge portions 38 of FIG. 7 form a substantially 90° angle. Deformed edge portions 38 of FIG. 7 are embedded in the thermoplastic material of duct 15 extending there through, which forms attachment head 23. During the blow molding operation attachment head 23 is shaped by means of abutment with the interior surface of the mold.

Rigid support (a) may have extensions, e.g., anchoring extensions, which extend into the thermoplastic material of rigid thermoplastic hollow member (b). Each extension has walls, e.g., side walls, a hollow interior (e.g., a chamber), and at least one perforation in its walls. Portions of rigid thermoplastic hollow member (b) extend through the perforations of the anchoring extensions and into the chamber thereof. In an embodiment of the present invention, all of the perforations of the rigid support (a) are located within the walls of the anchoring extensions, and the rigid thermoplastic hollow member (b) is fixedly attached to rigid support (a) by means of the anchoring extensions. The anchoring extensions may have any desired shape, but are typically substantially cylindrical.

In FIG. 4, a sectional view of an anchoring extension 51 extending into the thermoplastic material of duct 15 is depicted. Extension 51 has walls 57 and a perforation 63. Perforation 63 has edges 54 which are embedded in the thermoplastic material of duct 15 which extends therethrough. The thermoplastic material of duct 15 extending through perforation 63 forms attachment head 66 within chamber 69 of extension 51. Rigid support 12 has a perforation 60 therein which is in communication with chamber 69 of extension 51. Perforation 60 can be used to form a vacuum within chamber 69, to assist in drawing attachment head 66 therein during blow molding operations. To prevent attachment head 66 from bursting during the blow molding process, a reversibly retractable core pin (not shown) may be extended from the interior wall of the mold through perforation 60 into chamber 69 to provide a limiting surface against which attachment head 66 abuts during its formation, as is known to the skilled artisan. While anchoring extension 51 is depicted as having only one perforation 63 in FIG. 4, it may have a plurality of perforations through which the thermoplastic material of duct 15 extends to form additional attachment heads within chamber 69.

An advantage of using anchoring extensions to fixedly attach duct 15 to rigid support 12 is the recession and accompanying protection that is afforded attachment head 66 within chamber 69. After formation of cross car beam 3, a thermosetting polymer composition, e.g., a two-pack epoxy or polyurethane composition, can be introduced into chamber 69 by means of perforation 60. The introduced thermosetting polymer composition at least partially fills chamber 69 and serves to protect and hold attachment head 66 in place.

Anchoring extension 51 of FIG. 4 may also be used to attach the cross car beam assembly 3 to a separate structure, e.g., the A-pillars of an automobile (not shown), in an embodiment of the present invention. This can be achieved, for example, by providing threaded portions (not shown) on the edges of rigid support 12 that define perforation 60, through which a bolt may then be threaded. Alternatively, a threaded nut (not shown) may be affixed over perforation 60, e.g., by means of welding, through which a bolt may then be partially treaded.

Figure 8:
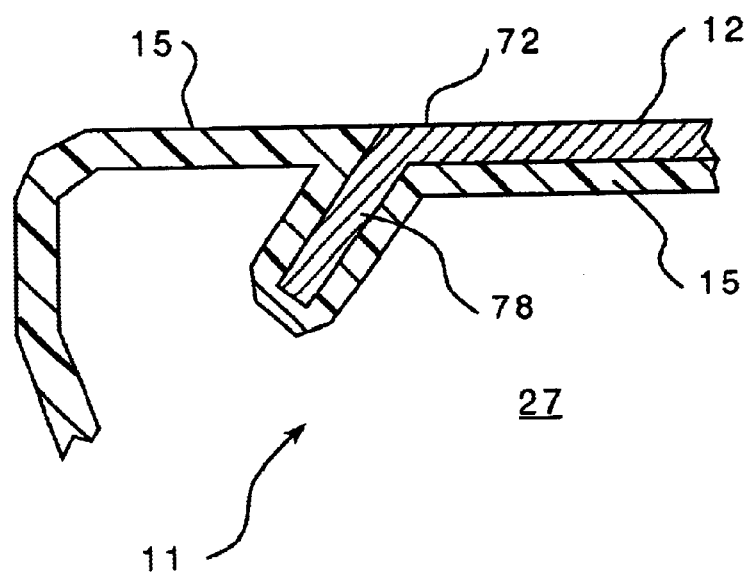
FIG. 8 is a sectional representation of a wrap-around attachment means, in which a portion of rigid hollow member (b) wraps around and embeds at least a portion of the edges of rigid support (a) therein.

In an embodiment of the present invention, rigid support (a) has edges which are at least partially embedded in portions of rigid hollow member (b) that are wrapped there around (wrap-around attachment means). With reference to FIG. 2, portions of edges 72 and/or 75 of rigid support 12 may be embedded in portions of the thermoplastic material of duct 15. A sectional representation of a wrap-around attachment means 11 is depicted in FIG. 8. With further reference to FIG. 8, edge portion 72 of rigid support 12 has an extension 78 which is embedded in the rigid thermoplastic material of rigid hollow thermoplastic duct 15. Such wrap-around attachment means are preferably formed during the blow molding formation of rigid hollow thermoplastic duct 15. Wrap-around attachment means, such as attachment means 11 of FIG. 8, serve to further fixedly attach rigid hollow member (b) to rigid support (a) of the molded article of the present invention. In another embodiment of the present invention (not shown), extension 78 of wraparound attachment means 11 is not present, and edge portion 72 is beveled or chamfered (not shown). The beveled edge portion of rigid support (a) is at least partially embedded in portions of the thermoplastic material of rigid hollow member (b) that are wrapped there around.

Molded articles according to the present invention include, but are not limited to, air ducts that also provide structural support, e.g., cross car beams for use in vehicles, such as cars and trucks. The molded articles of the present invention may also be used as structurally supporting air ducts in buildings, factories and homes, and in the aircraft industry.

The present invention has been described with reference to specific details of particular embodiments thereof. It is not intended that such details be regarded as limitations upon the scope of the invention except insofar as and to the extent that they are included in the accompanying claims.

What is claimed is:

1. A molded article comprising:
   (a) a rigid support having a first surface, a second surface and a plurality of perforations having edges; and
   (b) a molded rigid member of thermoplastic material, at least a portion of said rigid member being in abutting relationship with the first surface of said rigid support, said rigid member having a hollow interior and being a continuous unitary hollow member, wherein said article is prepared by a process comprising blow molding a thermoplastic parison precursor of said rigid member (b) onto the first surface of said rigid support (a), a portion of the thermoplastic material of said thermoplastic parison extends through at least some of said perforations of said rigid support (a), the edges of said perforations being embedded in the plastic material extending therethrough, thereby fixedly attaching said rigid member (b) to said rigid support (a).

2. The molded article of claim 1 wherein said rigid support (a) is fabricated from a material selected from metal, thermoset plastic material, thermoplastic material and combinations thereof.

3. The molded article of claim 2 wherein said rigid support (a) is fabricated from metal.

4. The molded article of claim 1 wherein the thermoplastic material of said rigid hollow member (b) is selected from at least one of thermoplastic polyolefins, thermoplastic polyvinylchlorine, thermoplastic polyurethanes, thermoplastic polyureas, thermoplastic polyamides, thermoplastic polyesters and thermoplastic polycarbonates.

5. The molded article of claim 1 wherein the thermoplastic material of said rigid hollow member (b) is reinforced with a material selected from glass fibers, carbon fibers, metal fibers, polyamide fibers and mixtures thereof.

6. The molded article of claim 1 wherein said rigid hollow member (b) is further fixedly attached to said rigid support (a) by attachment means selected from fasteners, adhesives and combinations thereof.

7. The molded article of claim 1 wherein said rigid support (a) has edges, and said rigid hollow member (b) is further fixedly attached to said rigid support (a) by means of portions of said rigid hollow member (b) wrapping around and embedding at least a portion of the edges of said rigid support (a).

8. The molded article of claim 1 wherein said rigid support (a) has a plurality of anchoring extensions extending into said rigid hollow member (b), each of said anchoring extensions having walls, an interior chamber and at least one wall perforation in said walls, each wall perforation having edges, a portion of said rigid hollow member (b) extends through at least some of said wall perforations into said chamber, the edges of said wall perforations being embedded in the plastic material extending therethrough, thereby fixedly attaching said rigid hollow member (b) to said rigid support (a).

9. The molded article of claim 1 wherein said molded article is an automotive cross car beam.

10. The molded article of claim 9 wherein said rigid hollow member (b) is an air duct.

11. The molded article of claim 1 wherein at least some of said perforations have deformed edge portions, and said deformed edge portions are embedded in the plastic material extending therethrough.

12. The molded article of claim 1 wherein the blow molding process by which said molded article is prepared further comprises at least one of (i) providing increased gaseous pressure on the interior of said thermoplastic parison, and (ii) providing reduced gaseous pressure on the second surface of said rigid support (a), thereby forcing portions of said thermoplastic parison through at least some of said perforations.

13. A method of preparing a molded article comprising a molded rigid hollow thermoplastic member fixedly attached to a rigid support, said method comprising:

(I) placing said rigid support in a mold, said rigid support having a plurality of perforations having edges, a first surface and a second surface; and (II) blow molding a thermoplastic parison precursor of said rigid hollow member against the first surface of said rigid support;

wherein a portion of the thermoplastic material of said thermoplastic parison extends through at least some of said perforations of said rigid support, the edges of said perforations being embedded in the plastic material extending therethrough, thereby attaching fixedly said rigid hollow member to said rigid support.

14. The method of claim 13 wherein during blow molding step (II), at least one of, (i) increased gaseous pressure is provided on the interior of said thermoplastic parison, and (ii) reduced gaseous pressure is provided on the second surface of said rigid support, thereby forcing portions of said thermoplastic parison through at least some of said perforations.

15. The method of claim 13 wherein said rigid support is fabricated from a material selected from metal, thermoset plastic material, thermoplastic material and combinations thereof.

16. The method of claim 13 wherein the thermoplastic material of said thermoplastic parison precursor of said rigid hollow member comprises at least one member selected from thermoplastic polyolefins, thermoplastic polyvinylchlorine, thermoplastic polyurethanes, thermoplastic polyureas, thermoplastic polyamides, thermoplastic polyesters and thermoplastic polycarbonates.

17. The method of claim 1 wherein the thermoplastic material of said thermoplastic parison precursor of said rigid hollow member is reinforced with a material selected from glass fibers, carbon fibers, metal fibers, polyamide fibers and mixtures thereof.

18. A molded article comprising:

(a) a rigid support having a first surface, a second surface and a plurality of perforations having edges; and (b) a molded rigid member of thermoplastic material, at least a portion of said rigid member being in abutting relationship with the first surface of said rigid support, said rigid member having a hollow interior, wherein said article is prepared by a process comprising blow molding a thermoplastic parison precursor of said rigid member (b) onto the first surface of said rigid support (a), a portion of the thermoplastic material of said thermoplastic parison extends through at least some of said perforations of said rigid support (a), the edges of said perforations being embedded in the plastic material extending therethrough, thereby fixedly attaching said rigid member (b) to said rigid support (a), and further wherein said rigid support (a) has a plurality of anchoring extensions extending into said rigid hollow member (b), each of said anchoring extensions having walls, an interior chamber and at least one wall perforation in said walls, each wall perforation having edges, a portion of said rigid hollow member (b) extends through at least some of said wall perforations into said chamber, the edges of said wall perforations being embedded in the plastic material extending therethrough, thereby fixedly attaching said rigid hollow member (b) to said rigid support (a).

19. A molded article comprising:

(a) a rigid support having a first surface, a second surface and a plurality of perforations having edges; and (b) a molded rigid member of thermoplastic material, at least a portion of said rigid member being in abutting relationship with the first surface of said rigid support, said rigid member having a hollow interior, said rigid hollow member being an air duct, wherein said article is prepared by a process comprising blow molding a thermoplastic parison precursor of said rigid member (b) onto the first surface of said rigid support (a), a portion of the thermoplastic material of said thermoplastic parison extends through at least some of said perforations of said rigid support (a), the edges of said perforations being embedded in the plastic material extending therethrough, thereby fixedly attaching said rigid member (b) to said rigid support (a), and further wherein said molded article is an automotive cross car beam.

* * * * *